July 16, 1957     M. KRAMCSAK, JR     2,799,514
STORE SERVICE CARRIER WITH TRAILING CASTER
Filed May 19, 1954     2 Sheets-Sheet 1
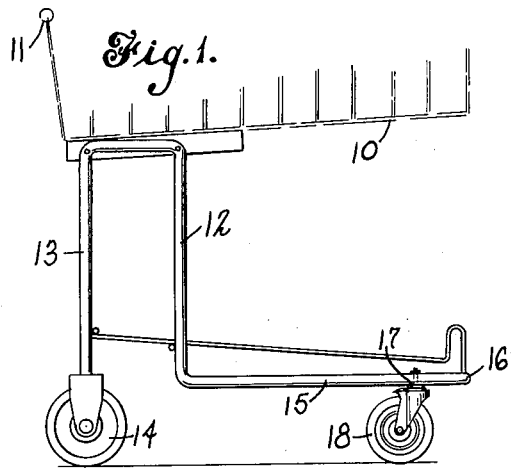
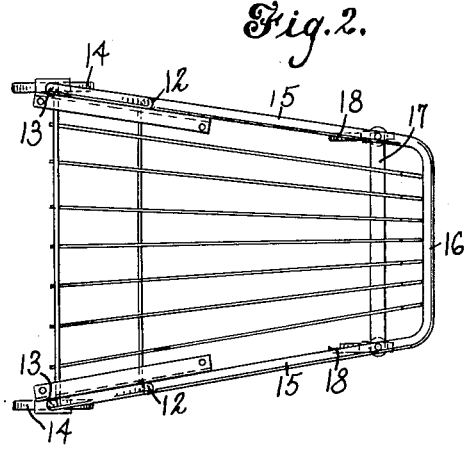
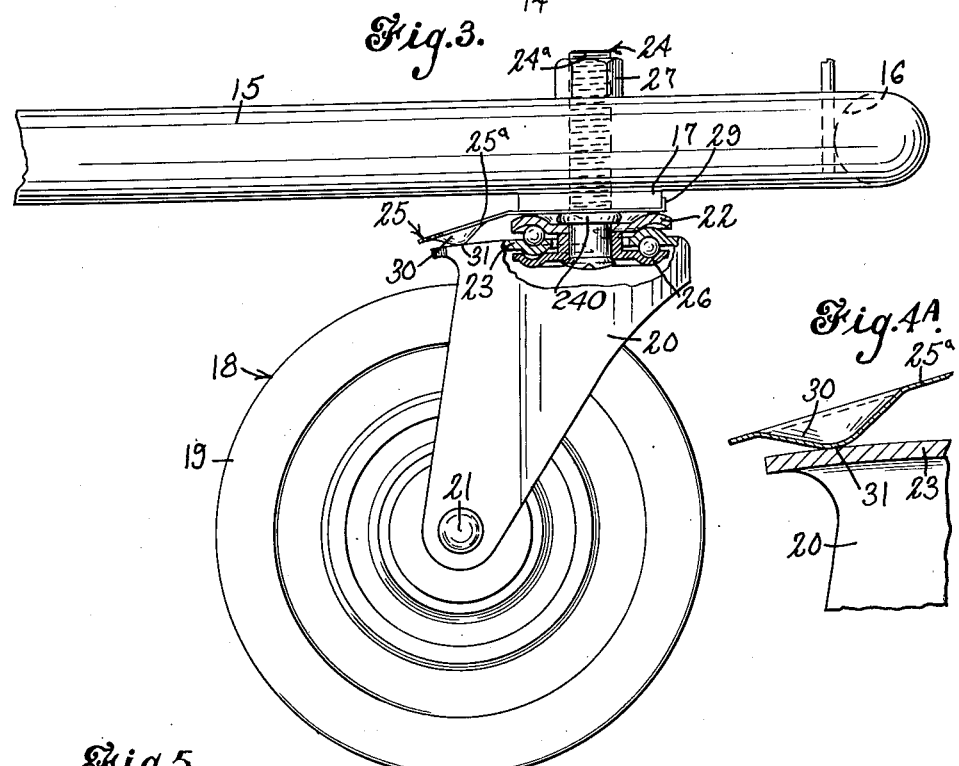
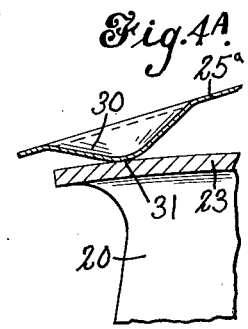
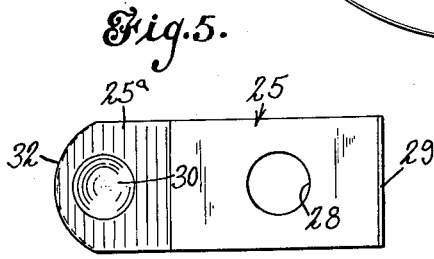
INVENTOR
M. Kramcsak, Jr.
BY
ATTORNEYS

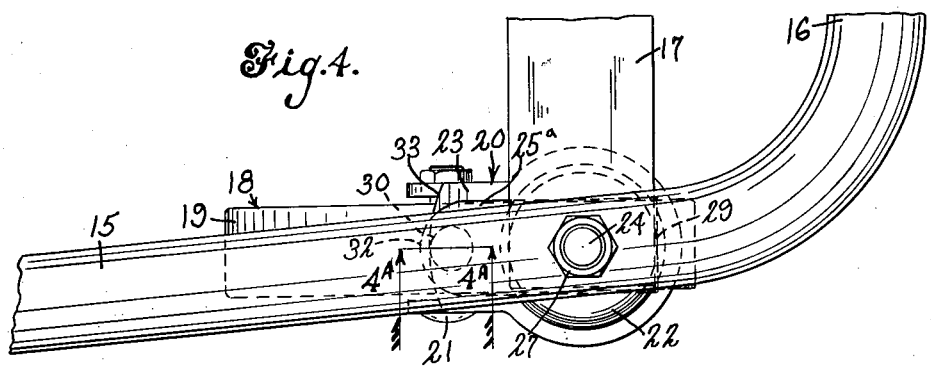
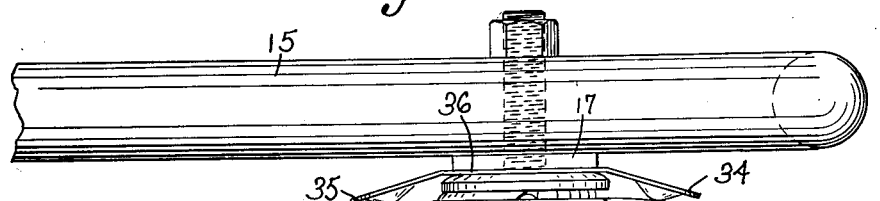
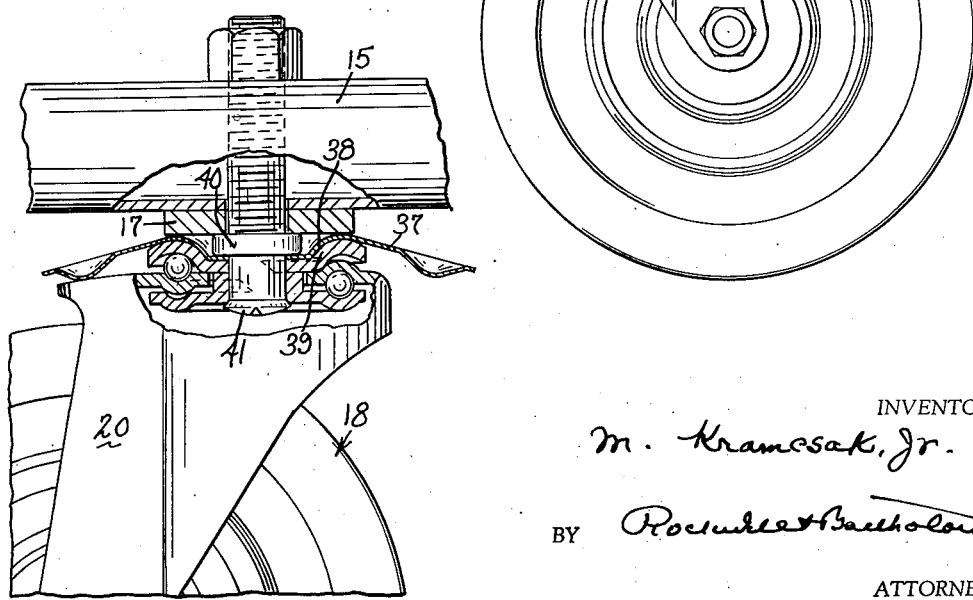

United States Patent Office 2,799,514
Patented July 16, 1957

2,799,514

STORE SERVICE CARRIER WITH TRAILING CASTER

Michael Kramcsak, Jr., Bridgeport, Conn., assignor to The Bassick Company, Bridgeport, Conn., a corporation of Connecticut Application May 19, 1954, Serial No. 430,820

3 Claims. (Cl. 280—29)

This invention relates to small trucks such as used for store service carriers, provided with trailing casters.

In small trucks propelled by hand, for example those used in self-service grocery stores, it is common practice to provide the rear of the truck with casters of the fixed type and the forward end with those of the swiveling type. When, however, such an arrangement is used on the truck or carrier, the manipulation of the latter into, through and out of the corridors of the store is attended by various difficulties, inconveniences and delays, with carriers of the kind now in common use. It is very difficult for a housewife or other unskilled person to keep the vehicle under control at all times and do the rather delicate maneuvering which is called for.

A primary source of the difficulty which is encountered is believed to arise from the lack of proper control of the swivel casters which are employed and more especially where two or more swivel casters are used at the front end of the vehicle. There are a number of conditions which, when the vehicle is pushed forwardly, cause the forward casters or some of them to set up a shimmying or wobbling action having untoward consequences. The shimmying or wobbling may be caused by an uneven tread or contact surface of a caster wheel or it may be caused by an uneven floor surface having humps and hollows. This condition may arise where there is not a continuous uniform bearing of the wheel against the floor. In some instances, the difficulty may arise, at least in part, on account of the fact that four casters are supposed to be in contact with the floor at all times. This difficulty might be overcome to an extent by giving the vehicle three points of contact but the latter arrangement leads to other objections which it is not necessary to consider here.

The wobbling or shimmying, as above indicated, makes the vehicle hard to control and leads to trouble in steering as in turning corners and, moreover, where there is wobbling from side to side of a trailing caster and failure of the caster wheel to follow the desired course or make the desired turn, there is a drag which makes the propulsion of the vehicle difficult and onerous.

An object of the present invention is to provide an improved vehicle of the type referred to which is more readily controlled and steered than those heretofore used.

Another object is to provide a hand-propelled vehicle having a forwardly arranged swivel caster used in steering or directing the vehicle, which caster is effectively prevented or inhibited from wobbling or shimmying when the caster, in the advancing movement of the vehicle, is in trailing position.

A further object is to provide a vehicle of the store service type having fixed rear casters and swiveling forward casters, the latter being of such structure and of such arrangement relatively to the vehicle as greatly to enhance the scope and effectiveness of the vehicle and overcome defects such as noted above.

In the accompanying drawings:

Fig. 1 is a side elevation of a store service carrier embodying the invention, the basket portion of the carrier being partially shown in broken lines;

Fig. 2 is a top plan view of the carrier with the basket portion removed;

Fig. 3 is a fragmentary side elevation showing the forward end portion of the carrier;

Fig. 4 is a fragmentary top plan view showing certain parts that appear in Fig. 3;

Fig. 4A is an enlarged section on line 4A—4A of of Fig. 4;

Fig. 5 is a detail top plan of the resilient friction member;

Fig. 6 is a view similar to Fig. 3 showing a modified structure; and

Fig. 7 is a fragmentary side elevation partly in section showing a further modification.

In the forms shown in Figs. 1 to 5, inclusive, the vehicle shown by way of example is a store service carrier having two fixed casters at the rear and two swivel casters at the forward end. The detailed construction of the upper part of the vehicle is not important, nor is the detailed structure of the under portion or main frame, except as hereinafter noted. In Fig. 1, the basket is partially shown by broken lines and it is to be understood that such vehicles are usually propelled by push from the rear upon an upper rear handle bar or like element. For illustrative purposes, such a handle bar is shown by broken lines in Fig. 1 as being a part of the basket structure. The under frame is illustrated as being at least in part of tubular metal and this frame or chassis member includes, in this example, a rear panel having rather widely spaced casters at the lower end, and it further includes a structure providing a front bar and side bars joined to the front bar, the forward end portion of the vehicle being narrower than the rear portion and the side bars converging toward the front bar. In this example, the under portion is reinforced by a cross bar interconnecting the side bars somewhat rearwardly of the front bar, and swivel casters are attached to said portion adjacent the points where the ends of the cross bar are fastened to the side bars. These casters are of a well-known kind in which the swivel axis is offset horizontally with reference to the axle on which the caster wheel is rotatable and the result is that, when the vehicle is pushed forwardly, each forward caster can assume a trailing position, as shown in Figs. 1 and 3 of the drawings.

In the drawings, the basket portion of the carrier is indicated at 10, the handle portion at 11, the main frame at 12, the rear panel at 13, the fixed casters at the lower end of this panel at 14, the frame side bars at 15, the front bar at 16, the reinforcing forward cross bar at 17, and each forward swivel caster at 18. Each caster 18 has a wheel 19, a fork or horn 20, an axle 21 in the horn about which the wheel is rotatable, a swivel plate or top plate 22 located above the top part 23 of the horn, and a swivel member 24 providing a swivel connection between the horn and the top plate, and at 25 is indicated a resilient friction member formed as a plate or strap in fixed relationship to the carrier frame and having a depending finger contacting the top of the horn for inhibiting wobbling or shimmying.

It is usual to employ an antifriction bearing in association with the swivel connection between the horn top and the top plate, and, in the case illustrated, there is a two-level ball race of the type disclosed in the Herold and Knittel patent, No. 1,914,204, of June 13, 1933. In the illustrated form, a disk-like member 26 forms a part of the ball race and a portion of the horn top 23 serves as another part of the ball race and the swivel member or pin 24 has an integral collar 240 abutting the upper face of swivel plate 22, the lower end of the swivel pin being swaged against the disk 26 to maintain the assembly.

In this particular case, the front bar 16 and side bars 15 are, in fact, of tubular form. The cross bar 17 is a flat bar placed at its ends against the lower surfaces of the side bars in the relationship shown in Fig. 3 (and Fig. 7), the end portions of the cross bar being provided with suitable holes for the swivel pin 24 and the side bars also being provided with holes registering with those of the cross bar, thus enabling each caster to be fastened on the frame in the manner shown in Fig. 3. In this form, each swivel pin 24 is provided in the portion above the swivel plate with a threaded shank 24ª adapted to be passed through the holes in the cross bar and side bar, the assembly being completed by a nut 27 engaging the threaded shank 24ª and bearing against the upper surface of the corresponding side bar. In this assembly, the friction member 25 is placed beneath the cross bar 17 with a hole 28 in the flat body or base portion registering with the holes in the cross bar and side bar, and the caster is then placed in position with the swivel pin engaging said holes and the collar 240 of the swivel pin clamped against the lower surface of the friction member body to hold the latter firmly in place against the cross bar.

For holding the elongated friction plate or strap substantially parallel to the longitudinal axis or median line of the vehicle so that it will be substantially in line with the horn when the vehicle is being pushed forwardly, suitable holding means is provided. In the form shown, the upstanding stem or pin 24 of the caster passes through the hole 28 intermediate of the ends of the friction member, and at the forward end of the latter member an integral upturned flange 29 is provided extending transversely of the member. This flange engages the forward edge of the cross bar 17, as shown in Fig. 3, when the parts are all assembled, and by this arrangement angular displacement of the friction member is prevented. Toward the other end of the friction member, the latter is turned or inclined downwardly at a slight angle to provide a resilient finger portion 25ª, and preferably the contact between this portion and the top of the horn is effected by providing a displaced contact portion 30 on this part of the member. In the form shown, this contact portion is provided by depressing or cupping a portion of the friction plate from its upper surface to provide a round cup-like depression having a gently rounded point 31 depending from the finger 25ª and making contact with the upper surface of the horn near the rear edge of the horn top, as shown in Fig. 3. As will be noted from Fig. 5, this edge of the friction plate is rounded, as shown at 32, this part being sloped downwardly, as above mentioned, and the depressed or cupped portion 30 being in the longitudinal median line of the plate and having its rim or boundary placed so as to be near the curved edge 32.

The rear portion of the horn top may be curved on an arc having the swivel pin as its center to provide a rear edge 33, as indicated in Fig. 4. Also, as shown in Fig. 4, the friction member is preferably of a width somewhat less than the horn top in this region. It will be apparent from Fig. 4 that, if the caster is turned on its swivel axis, the contact part 31 may make contact with the horn at any of an infinite number of points on an arc concentric with the edge 33 of the horn which, in Figs. 3 and 4, is the rear or trailing edge. When the contact part engages any of these points, the resilient and friction action of the friction plate will cause the angular location of the horn and its wheel to be maintained in the absence of sufficient lateral thrust to cause relative displacement.

In the form shown in Figs. 1 to 5, inclusive, the width of the friction plate, in the region where the contact point is provided, is such that the caster wheel can swing to either side to an angle of approximately 30° before the horn passes out of contact with the contact part 31. This arrangement, however, is susceptible of variation to meet different conditions.

By providing the finger 25ª of resilient material with the cup-like depression having a gently rounded part making frictional contact with the upper surface of the horn, the area of contact between the finger and the horn is sufficient to afford effective resistance to the lateral swing of the horn. As brought out above, this resistance is effective throughout a substantial angle through which the horn can be turned. As hereinafter mentioned the contact point between the spring finger and the upper surface of the horn is substantially in vertical alignment with the wheel axis (Fig. 3). This means that the contact between the horn and the spring finger is in line with the direct thrust load on the caster. As the spring finger and the contact portion of the horn top are both directed substantially horizontally or approximately horizontally (Fig. 4A) it follows that the direct thrust load tends to maintain the contact between these cooperating frictionally interengaged parts rather than to impair this contact, and thus there is a substantial advantage over constructions where the frictional contact attempted to be maintained is between parts located laterally of each other. There is also an important advantage over constructions embodying a rounded rotary ball or the like lacking rigidity as well as sufficient contact area.

Moreover, in the present article the organization of parts is such that the relationship of the spring finger to the horn top is effectively maintained even when the vehicle is subjected to rough usage. The body portion of the resilient plate 25 is firmly held against the cross bar 17, this part of the spring plate being between the lower surface of the cross bar on the one hand and the upper bearing plate 22 and collar 240 on the other hand, whereby this part of the plate 25 is enclosed and protected. The pin 24 has the swivel plate 22 and the disk or lower bearing plate 26 firmly held between the collar 240 and the lower swaged end of the pin, and by tightening the nut 27 the body portion of plate 25 can be clamped very firmly between the parts above and below it, so that the body from which the spring finger extends can be held very rigidly against movement in any direction. Tightening nut 27 raises the plate 25 against bar 17 and raises the horn top (through plate 26) to maintain the existing contact between the spring finger and the horn top. The part of the horn top with which the spring finger is engaged is extended in the direction of the horn offset so that contact between the finger and horn can be in line with the direct thrust load, and this part of the horn top is relatively wide so that contact is maintained when the horn in trailing position is swung laterally toward either side through a substantial angle.

In the modified form shown in Fig. 6, the control of the forward caster is maintained when the caster is in the trailing position and also when it is in the nontrailing position. In this case, the friction plate or member is a double-ended one having a depending friction finger, similar to the one previously described, at each end. The depending portions of the member carrying the contact parts are made integral with the perforated body portion of the plate, and as shown in Fig. 6, a finger portion 34 will exercise control when the caster is in a nontrailing or forward position, and an identical finger portion 35 will exercise control in a manner previously described when the caster has the reverse or trailing position. In this case, as in the first case, the frame of the vehicle is provided with a cross bar 17 and the body of the friction member indicated at 36 is clamped against the lower face of the cross bar by tightening up on a nut engaging a threaded portion of the swivel pin. In this particular case, the friction plate or strap is placed parallel to the longitudinal median line of the vehicle and the fastening nut tightened to clamp it in this position. The method of operation will be obvious from what has been said above.

In the modified form shown in Fig. 7, a double-ended friction plate 37 is employed which is similar to that shown in Fig. 6, the principal difference being that the intermediate part 38 of the plate is cupped so as to conform to the central depression in the swivel plate 39. This friction member is tightly held against angular displacement by being clamped in and against the depression in the swivel plate by means of the collar 40 on the swivel pin and the swaged lower end 41 of this pin.

The device herein described is manifestly of very simple inexpensive character and yet it provides important new results in connection with the operation and manipulation of store service carriers and small trucks of a similar type which are hand propelled. Simplicity is an important characteristic and for providing such a truck with the necessary control facilitating maneuverability by unskilled persons, and providing for dextrous management, the mechanical changes from previous structures are relatively slight, both with respect to the arrangement of the main parts of the truck on the one hand and those of the caster structure on the other hand. With the ordinary truck, it is unnecessary to modify more than two caster assemblies in order to gain the advantages of the improvement, it being altogether unnecessary to provide four new casters, for example, or to provide mechanism for locking any caster horn positively in a single prescribed angular position from which release may be difficult. The required action in this case is a friction action against an ordinary caster horn by a member in the nature of a flat strap or plate having inherent resiliency sufficient to provide friction action at any of a multiplicity of points in a given area which will be sufficient to prevent or inhibit the objectionable wobbling, shimmying, shaking, or chattering, while, at the same time, not offering sufficient resistance and obstruction to the movements of the vehicle as to present objectionable interference to the desired vehicle movements.

It will be noted from Fig. 3, for example, that the contact point between the spring finger and the upper surface of the horn is substantially in the same vertical plane as the wheel axle. As above indicated, the spring finger can make contact with the horn throughout the horn width in this region where the horn top is approximately horizontal and has a width somewhat greater than the wheel tread. The upper surface of the horn at the rear of the trailing part provides a good contact for holding the spring finger with sufficient firmness for the purposes above indicated. There is no interference with the swinging of the caster to the trailing position, but when the caster has been swung to a true trailing position (parallel to the vehicle axis) the spring finger will be active for the purposes above indicated, and will remain active on subsequent handling of the vehicle until a substantial angular displacement of the horn has occurred carrying the horn beyond the range of the finger by movement of one side edge of the horn beyond the finger location. Such an arrangement wherein the horn provides a contact zone of appreciable width has been found to be a feature of advantage.

While three different forms of the device are shown, these are by way of example only and various modifications and changes in the details may be made without departing from the principles of the invention and the scope of the claims.

What I claim is:

1. In a caster structure for store service vehicles and the like, the combination of a forwardly extending side bar and a laterally directed cross bar having an end portion disposed under and against the lower surface of the side bar, said bars having registering vertical holes, a caster having a swivel pin with a threaded upward extension extended upwardly through said holes and held in place below said cross bar by a nut engaging said threaded extension above the side bar, said pin having above its lower extremity a collar supporting the pin relatively to said cross bar and the pin having at the lower extremity a clamping enlargement, a horn having an apertured top turnable relatively to the portion of said pin below said collar, said horn having at the lower part an axle and a wheel on the axle whose center is offset laterally from said swivel pin so that the wheel can take a trailing position, upper and lower bearing plates for the horn held on said swivel pin respectively above and below the horn top between said collar and said pin enlargement, a portion of said horn top being extended beyond said upper bearing plate in the direction of the offset of said horn and providing a contact space of substantial width for an overhanging contact member, and a thin resilient plate having a perforated body portion engaged with said swivel pin between said cross bar and said collar and clamped in fixed substantially horizontal position between said last-mentioned bar and collar, said resilient plate being elongated in the direction of travel of the vehicle and somewhat downturned to present a springy finger having adjacent its extremity a cupped frictional contact portion of appreciable area to contact with the horn top at various points within said contact space thereof to restrain the horn against turning, said contact portion of said finger member being substantially in vertical alignment with the wheel axle so as to coincide with the line of direct thrust load and the contact area engageable by said finger member being located along a curve of substantial extent crosswise of the horn top so that said finger will maintain its contact when the horn in trailing position is swung laterally toward either side through a substantial angle.

2. A structure as defined in claim 1, in which the body of the resilient finger-equipped plate is held between the collar on the swivel pin and the cross bar and is provided at the end opposite the finger with a positioning flange engaged with one side of said cross bar.

3. A structure as defined in claim 1, in which the resilient plate has in addition to the spring finger extended therefrom in one direction a second spring finger extended in the opposite direction and acting to hold the horn in the non-trailing position.

References Cited in the file of this patent

UNITED STATES PATENTS

| 1,434,732 | Boyle | Nov. 7, 1922 |
| 1,914,204 | Herold et al. | June 13, 1933 |
| 2,480,524 | Vallone et al. | Aug. 30, 1949 |
| 2,505,852 | Budnick et al. | May 2, 1950 |
| 2,583,858 | Kostolecki | Jan. 29, 1952 |
| 2,605,116 | Alexander | July 29, 1952 |
| 2,639,161 | Goldman | May 19, 1953 |